(12) United States Patent
Gertitschke et al.

(10) Patent No.: US 6,644,460 B2
(45) Date of Patent: Nov. 11, 2003

(54) APPARATUS FOR SORTING PILLS

(75) Inventors: Detlev Gertitschke, Laupheim (DE); Ralf Heim, Schnürpflingen (DE); Hans-Martin Pöhler, Laichingen (DE); Jürgen Matzenmüller, Bellamont (DE); Bernd Zoller, Laupheim (DE); Erich Jans, Burgrieden-Roth (DE); Harald Litke, Achstetten (DE)

(73) Assignee: Uhlmann Pac-Systeme GmbH & Co. KG, Laupheim (DE)

( * ) Notice: Subject to any disclaimer, the term of this patent is extended or adjusted under 35 U.S.C. 154(b) by 0 days.

(21) Appl. No.: 10/209,600

(22) Filed: Jul. 31, 2002

(65) Prior Publication Data

US 2003/0038144 A1 Feb. 27, 2003

(30) Foreign Application Priority Data

Aug. 2, 2001 (DE) .......................... 101 37 843

(51) Int. Cl.⁷ .............................. B65G 47/24; B23Q 7/12
(52) U.S. Cl. .................. 198/392; 198/393; 198/397.01; 221/167; 221/277
(58) Field of Search ................................ 198/392, 393, 198/397.01, 397.04, 803.5, 396; 221/159, 160, 167, 168, 169, 277

(56) References Cited

U.S. PATENT DOCUMENTS

| 2,991,871 | A | | 7/1961 | Lupo | |
|---|---|---|---|---|---|
| 4,104,966 | A | * | 8/1978 | Ackley, Jr. et al. | ..... 198/393 X |
| 4,312,438 | A | * | 1/1982 | Vatsvog | ....................... 198/392 |
| 4,479,573 | A | | 10/1984 | Ackley et al. | .............. 198/399 |
| 4,682,683 | A | | 7/1987 | Ackley et al. | .............. 198/380 |
| 5,531,312 | A | | 7/1996 | Dickey | ........................ 198/450 |
| 6,112,937 | A | * | 9/2000 | Takahashi et al. | ........... 221/167 |
| 6,161,676 | A | * | 12/2000 | Takahashi et al. | ....... 198/392 X |

FOREIGN PATENT DOCUMENTS

| DE | 694 25 877 | | 1/1994 | |
|---|---|---|---|---|
| DE | 196 11 061 | | 9/1997 | |
| GB | 1 070 173 | | 2/1966 | |
| JP | 2-231307 | * | 9/1990 | ................. 198/392 |
| WO | WO 00/07881 | | 2/2000 | |

* cited by examiner

*Primary Examiner*—Tuan N. Nguyen
(74) *Attorney, Agent, or Firm*—Herbert Dubno

(57) ABSTRACT

An apparatus for sorting and feeding identically shaped small objects has a funnel adapted to hold the objects and having a downwardly open outlet and a housing and a wheel together forming an arcuate passage generally centered on an axis and having an upper inlet end at the outlet and a lower outlet end so that the objects can enter the upper inlet end of the passage and move downward through the passage. The wheel has an outer periphery exposed in the passage and formed with a row of outwardly open pockets of a shape corresponding generally to a shape of the objects. The wheel is rotated such that its periphery moves upward in the passage so that the objects are separated from one another and aligned behind one another in the passage.

20 Claims, 6 Drawing Sheets

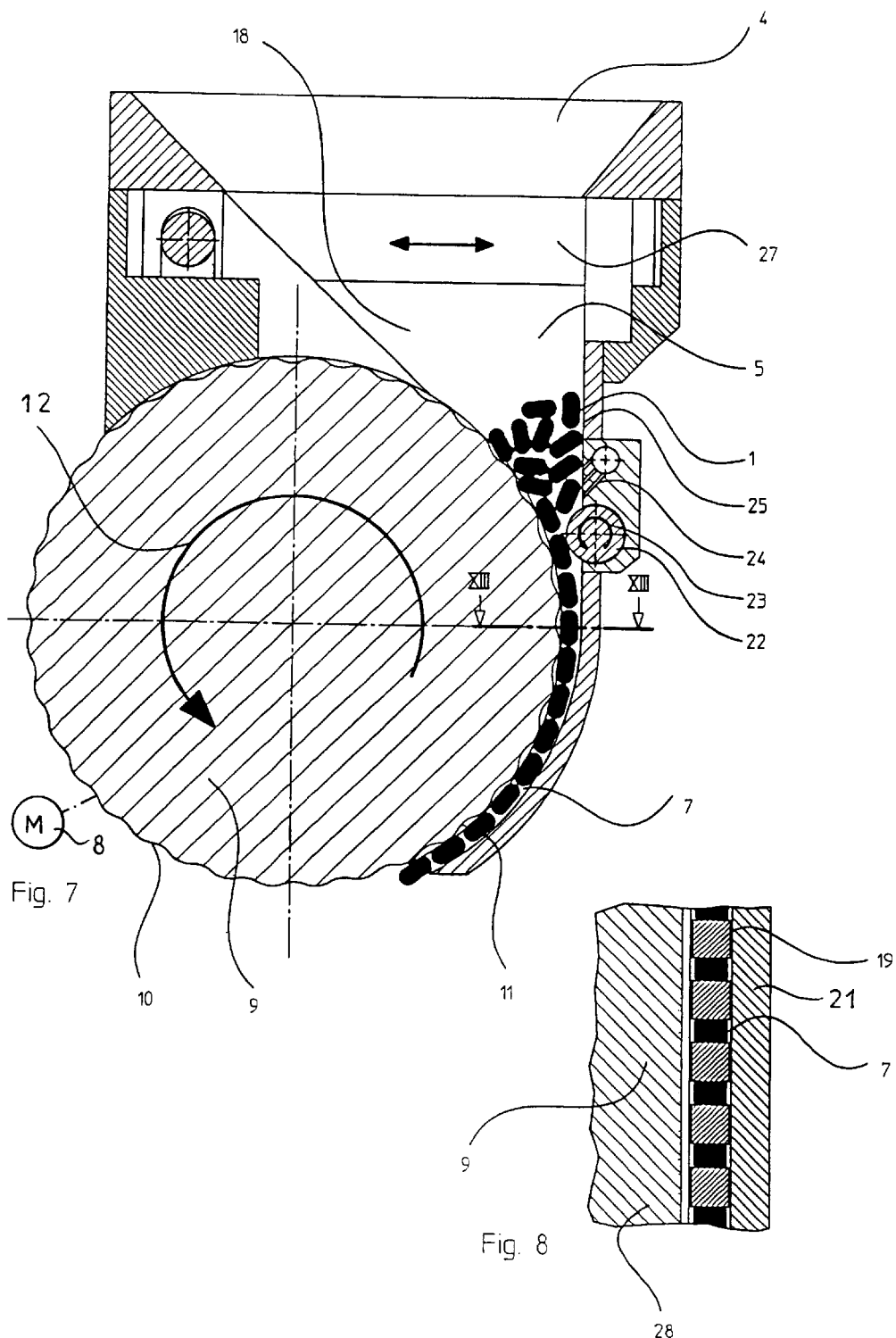

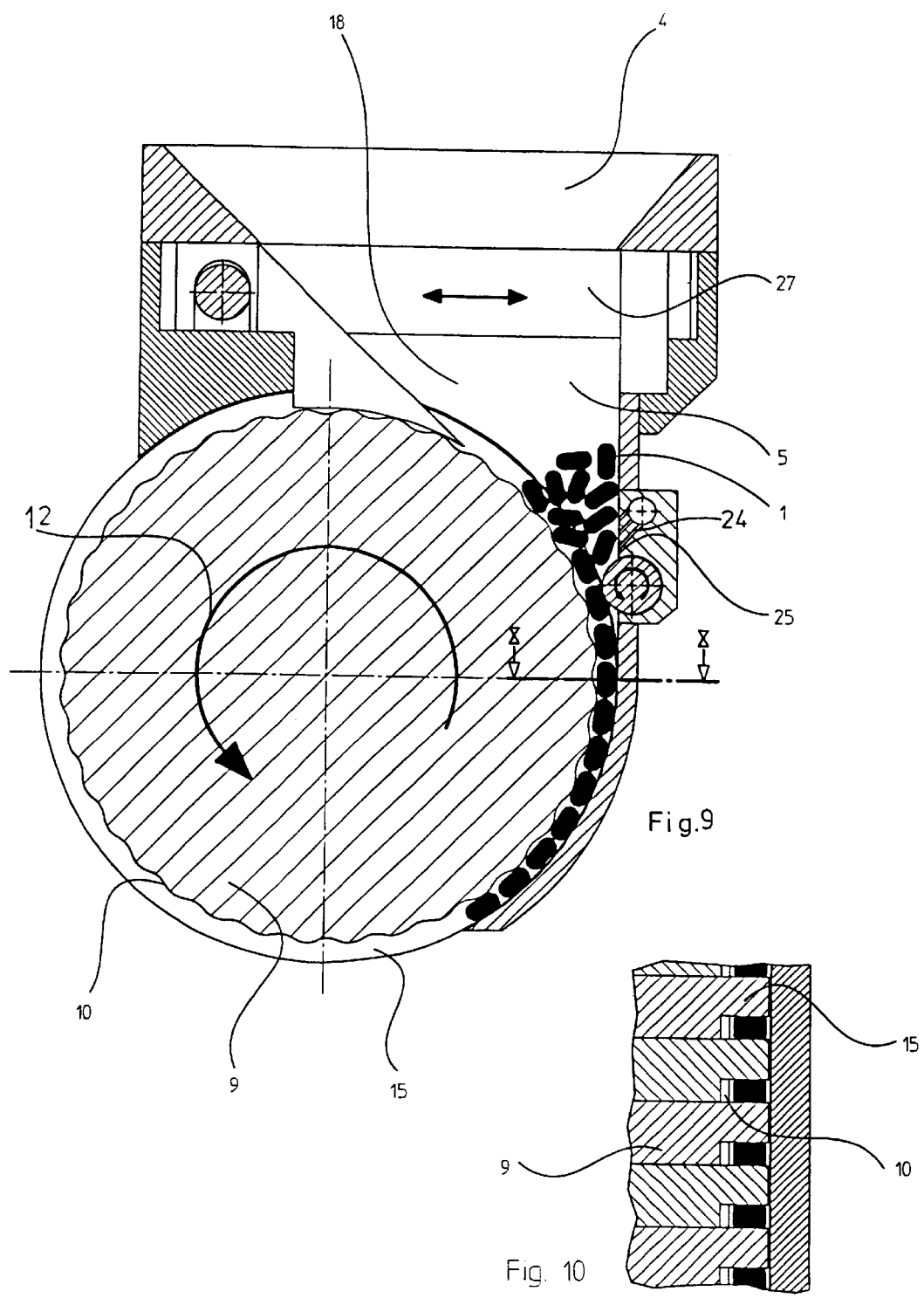

APPARATUS FOR SORTING PILLS

FIELD OF THE INVENTION

The present invention relates to apparatus for sorting and ordering pills. More particularly this invention concerns an apparatus that takes in identically shaped small objects—pills, capsules, lozenges, or the like—in bulk and outputs them one at a time in an orderly row.

BACKGROUND OF THE INVENTION

In order to package small objects such as pills, for instance individually in a blister pack, it is necessary to separate the pills that are typically delivered to the packaging machine in bulk format, that is all jumbled together. The standard machine for doing this has a hopper from which the pills flow into a funnel whose output only lets one object at a time pass into an upstream end of a feed passage. This passage is formed in turn between a normally stationary surface and the periphery of a rotating wheel whose function is to separate the objects from each other.

When the objects in question are elongated and of uniform cross-sectional size, for instance a standard capsule with a cylindrical body and rounded ends, such a system works very well. When, however, the object tapers to its ends, having a double-convex shape, it is possible for one object to overlap with another and even for the objects to wedge in the feed passage. The faster the sorting/ordering machine functions, the greater the likelihood of a misfeed or jam.

OBJECTS OF THE INVENTION

It is therefore an object of the present invention to provide an improved apparatus for sorting and ordering small objects.

Another object is the provision of such an improved apparatus for sorting and ordering small objects which overcomes the above-given disadvantages, that is which can even handle double-tapered or biconvex pills and the like without problems.

SUMMARY OF THE INVENTION

An apparatus for sorting and feeding identically shaped small objects has according to the invention a funnel adapted to hold the objects and having a downwardly open outlet and a housing and a wheel together forming an arcuate passage generally centered on an axis and having an upper inlet end at the outlet and a lower outlet end so that the objects can enter the upper inlet end of the passage and move downward through the passage. The wheel has an outer periphery exposed in the passage and formed with a row of outwardly open pockets of a shape corresponding generally to a shape of the objects. The wheel is rotated such that its periphery moves upward in the passage so that the objects are separated from one another and aligned behind one another in the passage.

With this system, therefore, the objects are simply separated from each other, the will flow by gravity countercurrent to the rotating wheel along the passage. Only if the objects overlap will the wheel move them backward, that is upward, in the passage, to separate them into a single-file line. The funnel opens directly into the passage over a distance wider than the length of several of the objects so it is impossible for the objects to jam before entering the passage.

The axis is horizontal and periphery is generally circular and centered the axis. The wheel is rotatable about the axis. In addition the outer periphery is of undulating shape.

In one system according to the invention the outer periphery is formed with a radially outwardly open groove having a floor formed with the pockets. Furthermore the apparatus has a disk having an axially directed end face forming an end surface of the passage. The disk and wheel can be separate parts or unitary. They are rotated in the same direction and normally at the same speed. Alternately the disk is stationary and only the wheel rotates.

The housing in accordance with the invention has a circularly arcuate inner edge defining a radially outer surface of the passage and the wheel outer periphery is radially spaced from the inner edge between the pockets by a distance equal to slightly more than a thickness of the objects. The funnel has a pair of side walls forming an angle of more than 90° with each other. This wide angle further prevents the objects from clumping together and jamming.

The apparatus has in accordance with the invention a plurality of the funnels spaced horizontally from each other and the apparatus has a plurality of wheels defining respective passages for the funnels. A plurality of bars extend transversely of the axis and define axially confronting end walls of the funnels. In this arrangement a common roller forms the wheels and is rotatable about the axis and formed with a plurality of axially extending and radially outwardly open grooves forming the pockets. Radially extending struts subdivide the passages from one another. Thus a simple change of the roller allows the system to be adapted to objects of different size, although it has been found that separation is excellent even if the pockets do not perfectly conform to the shape of the objects.

A second wheel separate from and smaller than the first-mentioned wheel is exposed in the passage generally at the funnel outlet. The wheels both rotate in the same direction. Thus the objects enter the passage between two surfaces, one formed by each of the wheels, that move in opposite directions so that any clumping together or jamming is impossible.

To further aid movement of the objects along the passages air is forced along the passage from the passage inlet end to the passage outlet end.

The wheel rotates about the axis and the funnel outlet is located above the axis. Normally the funnel outlet opens no higher than an apex of the wheel, but in most situations it actually is open somewhat below the wheel apex so that the objects move downward, never upward, as then go along the passage.

The housing according to the invention comprises a pair of plates aligned with the wheel. One of the plates is spaced from the wheel and forms therewith the passage and the other plate is closely juxtaposed with the wheel. This one plate is adjustably displaceable radially toward and away from the wheel to allow the apparatus to be adjusted to objects of different thicknesses. These objects are biconvex and the pockets are generally circularly arcuate.

BRIEF DESCRIPTION OF THE DRAWING

The above and other objects, features, and advantages will become more readily apparent from the following description, reference being made to the accompanying drawing in which:

FIG. 7 is a vertical section through another embodiment of the apparatus according to the invention;

FIG. 8 is a section taken along line VIII—VIII of FIG. 7;

FIG. 9 is a vertical section through another embodiment of the apparatus;

FIG. 10 is a section taken along line X—X of FIG. 9;

SPECIFIC DESCRIPTION

Figure 1:
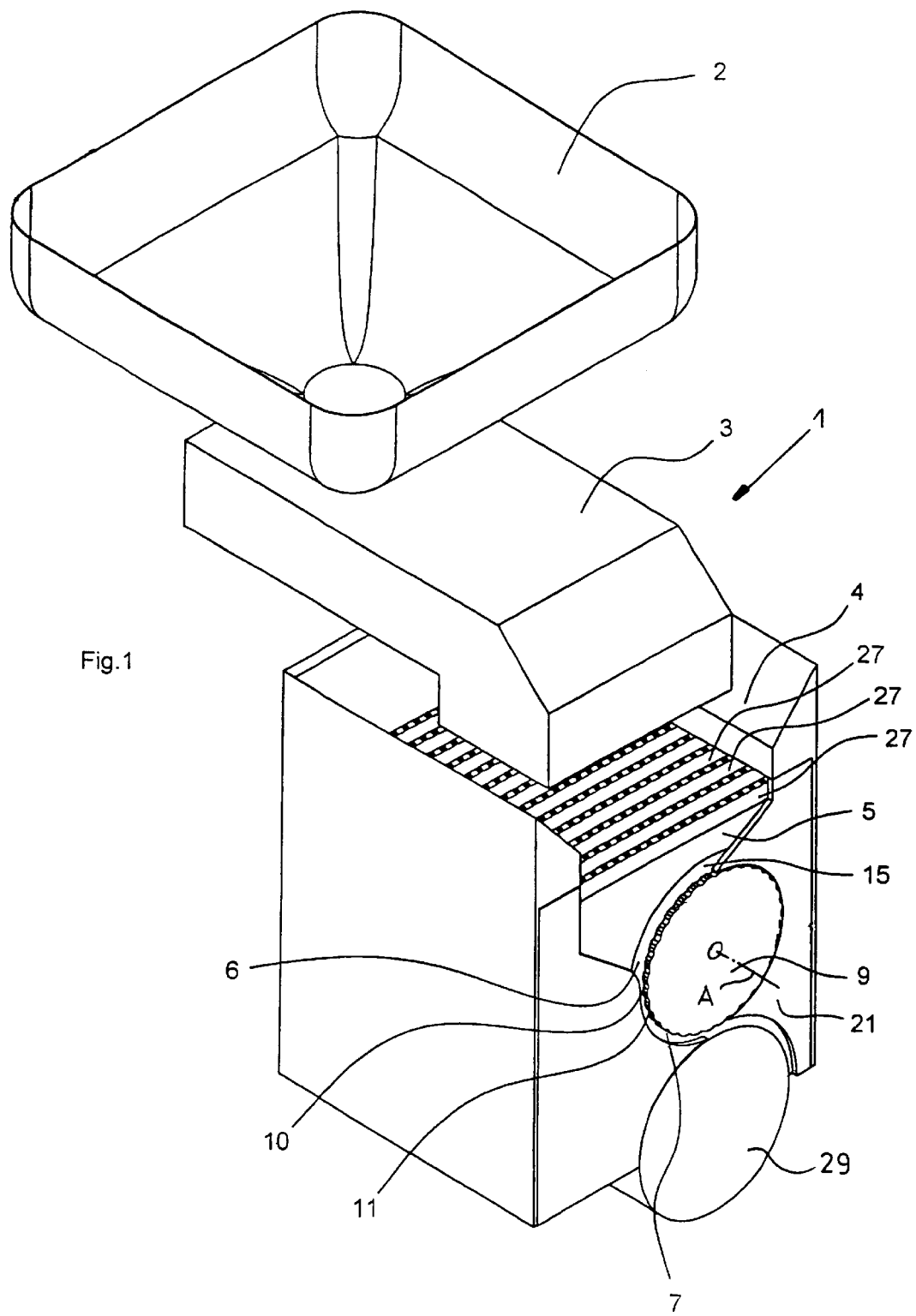
FIG. 1 is an exploded view of the apparatus according to the invention.
Figure 2:
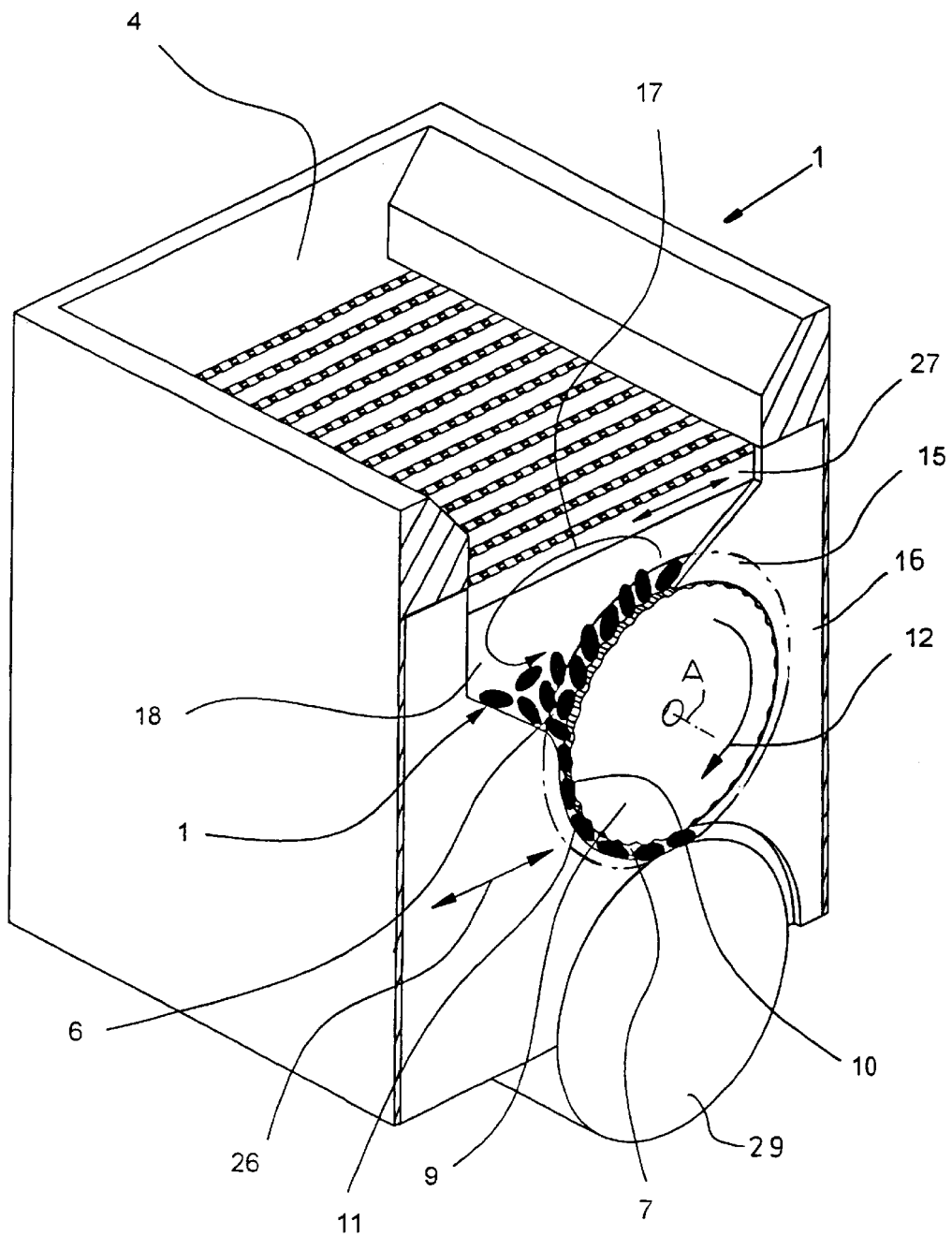
FIG. 2 is an assembled view of the apparatus.
Figures 3A, 3B:
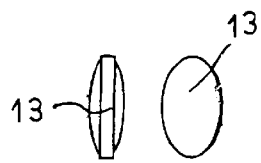
FIGS. 3A and 3B are 90° offset views of a small object, here a pill, being sorted and order by the apparatus.
Figure 4:
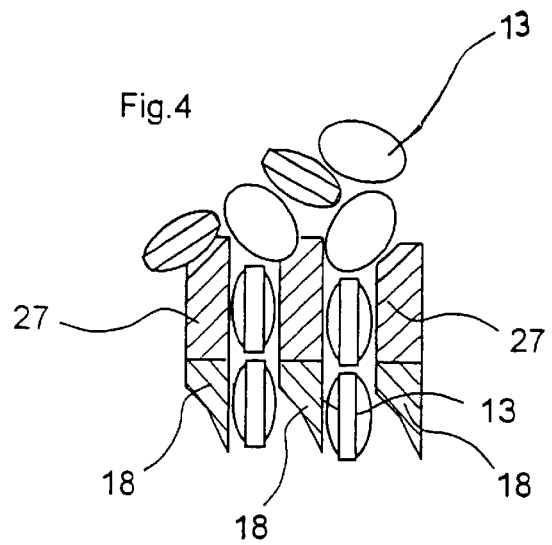
FIG. 4 a section through a detail of the apparatus.

As seen in FIGS. 1, 2, 4, and 6 an apparatus 1 for sorting and ordering small objects, here biconvex pills 13 (FIGS. 3A and 3B), has a supply hopper 2 that feeds the pills 13 in bulk to a vibratory feed trough 3 that in turn drops them into a hopper 4 that leads to the upper intake sides of a plurality of identical funnels 5 spaced apart along an axis A. Each funnel 5 is V-shaped and has a small lower outlet end 6 that opens to one side of the axis A into the upper end of a feed passage 7 along which the objects 13 pass single file, exiting at a lower end on a feed wheel 29 that sets them down in unillustrated blister packs.

The funnels 5 are defined between vertical plates 18 and vibrating bars 27 (see FIG. 4) extending across the top of the apparatus 1. Thus the objects 13 are presorted as they enter the tops of the funnels 5, but are still in a random jumbled array as they migrate downward to the lower outlet ends 6 of the funnels 5.

Figure 6:
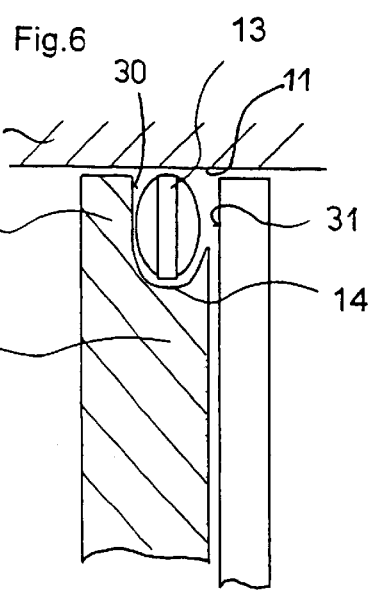
FIG. 6 is a section through another detail of the apparatus.

Each feed passage 7 is circularly arcuate and centered on the horizontal axis A. The passage 7 has as shown in FIG. 6 an outer surface 11 formed by a housing plate 21, an inner surface 14 spaced radially inward from and parallel to the outer surface 11 and formed by a wheel 9 itself centered on and rotatable about the axis A, and a pair of axially spaced back and front end surfaces 30 and 31 (FIG. 6) extending parallel to each other and perpendicular to the axis A. According to the invention the inner surface 14, which is formed by the outer periphery of the wheel 9, is formed as a groove with a series of radially outwardly open pockets 10 of a shape generally complementary to that of the objects 13, so that the edge of the wheel 9 is undulating. The radial spacing of the surfaces 11 and 14 at crests between the pockets 10 is equal to slightly more than the thickness of the objects 13. This spacing can be varied by shifting the plate 21 as indicated by arrow 26. Diametrally opposite the plate 21 the apparatus 1 has a stationary wall plate 16 whose part-circular edge is centered on the axis A and very closely spaced to the crests between the pockets 10 on the wheel 9 so that the objects 13 cannot get between the wheel 9 and the wall 16 on this side.

Figures 5A, 5B, 5C:
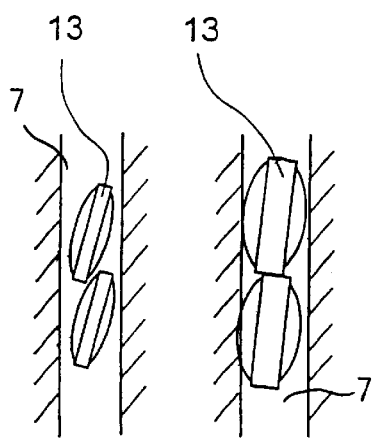
FIGS. 5A, 5B, and 5C are sectional views illustrating the feeding of pills of different sizes.

The wheel 9, which may be unitary with a disk 15 forming the wall 30 as shown in FIGS. 6 and 10 and fitting in circular holes in the respective funnel plate 18, is rotated (e.g. by a motor 8 as shown in FIG. 7) in a direction 12 opposite to the downward movement direction of the objects 13 through the passage 7 so that a rolling counterflow as indicated by arrow 17 is created in the objects 13 in the funnel 5. This ensures that the objects 13 do not move into positions overlapping each other as they flow through the passage 7, as illustrated in FIGS. 5A and 5C, even when the objects 13 are not a snug fit in the passage 7 as shown in FIG. 5B.

Figure 12:
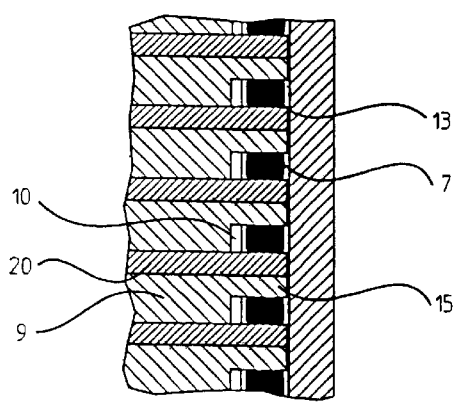
FIG. 12 is a section taken along line XII—XII of FIG. 11.

The front end surface 31 can either be formed by the back of the adjacent disk 15 as shown in FIGS. 6 and 10 or by separate plates 20 positioned between the wheel 9 and disk 15 as shown in FIG. 12. The plates 9 can be formed as a roller 28 as shown in FIG. 8, in which case the pockets 10 are formed by axially extending and radially outwardly open grooves formed in the roller 28, with the surfaces 30 and 31 defined by transverse webs or bars 19 fixed in the machine or on the plate 21.

Figure 11:
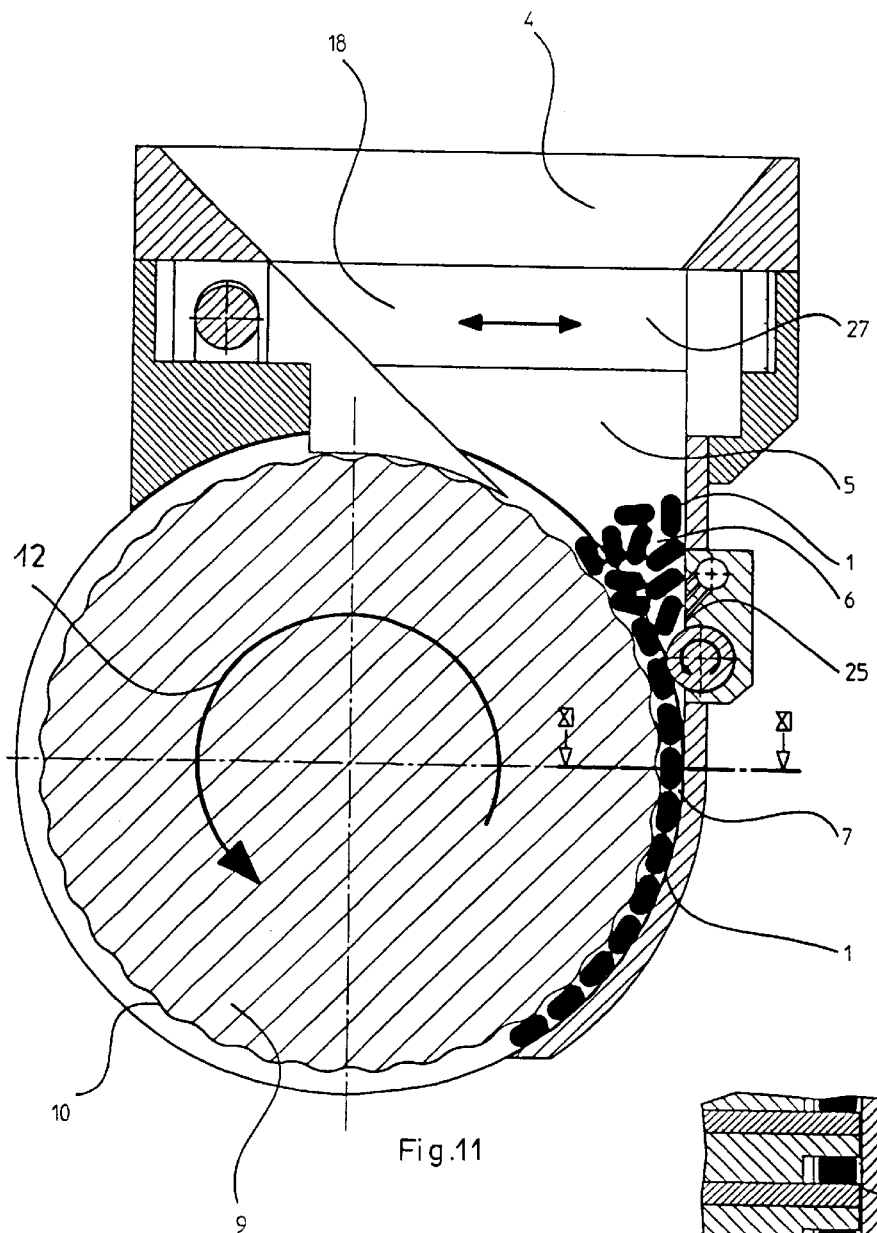
FIG. 11 is a vertical section through yet another embodiment of the invention.

To further ensure proper separation and feeding of the objects, FIGS. 7, 9, and 11 show a wheel 22 (here formed by a long cylinder extending past all the passages 7 and of a diameter equal to about one-fifth that of the wheel 9) extending onto the passage 7 at its upstream end and rotated in a direction 23 that is the same as the rotation direction 12 of the wheel 9, so that the pills 13 pass between oppositely moving surfaces as they enter the passage 7. This separates them from one another and aligns them in a straight row. In addition nozzles 24 directs jets of air down into the upper end of the passage 7 from a vertical side wall 25 of the funnel 5 and an unillustrated blower aspirates air from the lower end of the passage 7, further pulling the objects 13 along the passage 7 and ensuring that they feed smoothly.

Thus with this system the jumbled-together pills 13 are circulated as shown at 17 in the funnel 5 and then enter the upper end of the passage 7, which end is at or below the uppermost portion of the wheel 9. The rotation of this wheel 9 opposite to the natural movement by gravity of the pills 13 downward separates them from each other, and the pockets 10 on the periphery of the wheel 9 separates overlapping pills 13 from one another. The pills 13 therefore move into alignment one behind the other and exit the apparatus 1 in a perfect row at a uniform spacing.

What is claimed is:

1. An apparatus for separating and feeding identically shaped small objects, the apparatus comprising:

a funnel holding the objects and having a downwardly open outlet;

a housing and a wheel together forming an arcuate passage generally centered on an horizontal axis and having an upper inlet end at the outlet and a lower outlet end, whereby the objects can enter the upper inlet end of the passage and move downward through the passage, the wheel having an outer periphery forming a radial inner surface of the passage and formed with an annularly continuous row of radially outwardly open pockets of a shape corresponding generally to a shape of the objects, the housing and wheel forming axially directed end surfaces axially bounding the passage, the housing forming a radially inwardly directed outer surface of the passage radially confronting the periphery of the wheel; and means for rotating the wheel such that the periphery moves upward in the passage, whereby the objects are separated from one another and aligned behind one another in the passage.

2. The apparatus defined in claim 1 wherein the periphery is exposed at the funnel outlet.

3. The apparatus defined in claim 1 wherein the axis is horizontal and periphery is generally circular and centered the axis, the wheel being rotatable about the axis.

4. The apparatus defined in claim 3 wherein the outer periphery is of undulating shape.

5. The apparatus defined in claim 4 wherein the outer periphery is formed with a radially outwardly open groove having a floor formed with the pockets.

6. The apparatus defined in claim 1 wherein the housing has a circularly arcuate inner edge defining radially inwardly directed outer surface of the passage and the wheel outer periphery is radially spaced from the inner edge between the pockets by a distance equal to slightly more than a thickness of the objects.

7. The apparatus defined in claim 1 wherein the funnel has a pair of side walls forming an angle of more than 90° with each other.

8. The apparatus defined in claim 1 wherein the apparatus has a plurality of the funnels spaced horizontally from each other and the apparatus has a plurality of wheels defining respective passages for the funnels.

9. The apparatus defined in claim 8 wherein the housing includes a plurality of bars extending transversely of the axis and defining the axially confronting end surfaces of the funnels.

10. The apparatus defined in claim 1, further comprising
means for forcing air along the passage from the passage inlet end to the passage outlet end.

11. The apparatus defined in claim 1 wherein the wheel rotates about the axis and the funnel outlet is located above the axis.

12. The apparatus defined in claim 1 wherein the housing comprises a pair of plates aligned with the wheel, one of the plates being spaced from the wheel and forming therewith the outer surface of the passage and the other plate being closely juxtaposed with the wheel.

13. The apparatus defined in claim 12 wherein the one plate is adjustably displaceable radially toward and away from the wheel.

14. The apparatus defined in claim 1 wherein the objects are biconvex and the pockets are generally circularly arcuate.

15. An apparatus for separating and feeding identically shaped small objects, the apparatus comprising:
a plurality of horizontally spaced funnels holding the objects and each having a downwardly open outlet;
a housing;
a roller forming together with the housing a plurality of arcuate passages generally centered on an axis and each having an upper inlet end at a respective one of the outlets and a lower outlet end, whereby the objects can enter the upper inlet ends of the passages and move downward through the passages, the roller having an outer periphery exposed in the passages and formed with a row of outwardly open grooves forming in the respective passages pockets of a shape corresponding generally to a shape of the objects; and
means for rotating the roller such that the pockets move upward in the respective passages, whereby the objects are separated from one another and aligned behind one another in the passages.

16. The apparatus defined in claim 15 wherein the housing includes radially extending struts subdividing the passages from one another.

17. An apparatus for separating and feeding identically shaped small objects, the apparatus comprising:
a funnel holding the objects and having a downwardly open outlet;
a housing;
a wheel rotatable about the axis forming together with the housing an arcuate passage generally centered on a horizontal axis and having an upper inlet end at the outlet and a lower outlet end, whereby the objects can enter the upper inlet end of the passage and move downward through the passage, the wheel having an outer generally circular periphery centered on the axis, exposed in the passage, and formed with a row of outwardly open pockets of a shape corresponding generally to a shape of the objects;
means for rotating the wheel such that the periphery moves upward in the passage, whereby the objects are separated from one another and aligned behind one another in the passage; and
a disk having an axially directed end face forming an end surface of the passage.

18. The apparatus defined in claim 17, wherein the disk and wheel are unitary and rotate jointly.

19. The apparatus defined in claim 17, wherein the disk is stationary.

20. An apparatus for separating and feeding identically shaped small, objects, the apparatus comprising:
a funnel holding the objects and having a downwardly open outlet;
a housing and a first wheel together forming an arcuate passage generally centered on an axis and having an upper inlet end a at the outlet and a lower outlet end, whereby the objects can enter the upper inlet end of the passage and move downward through the passage, the wheel having an outer periphery exposed in the passage and formed with a row of outwardly open pockets of a shape corresponding generally to a share of the objects;
a second wheel separate from and smaller than the first wheel and exposed in the passage generally at the funnel outlet; and
means for rotating both the wheels in the same direction with the periphery of the first wheel moving upward in the passage, whereby the objects are separated from one another and aligned behind one another in the passage.

* * * * *